Figure 1:
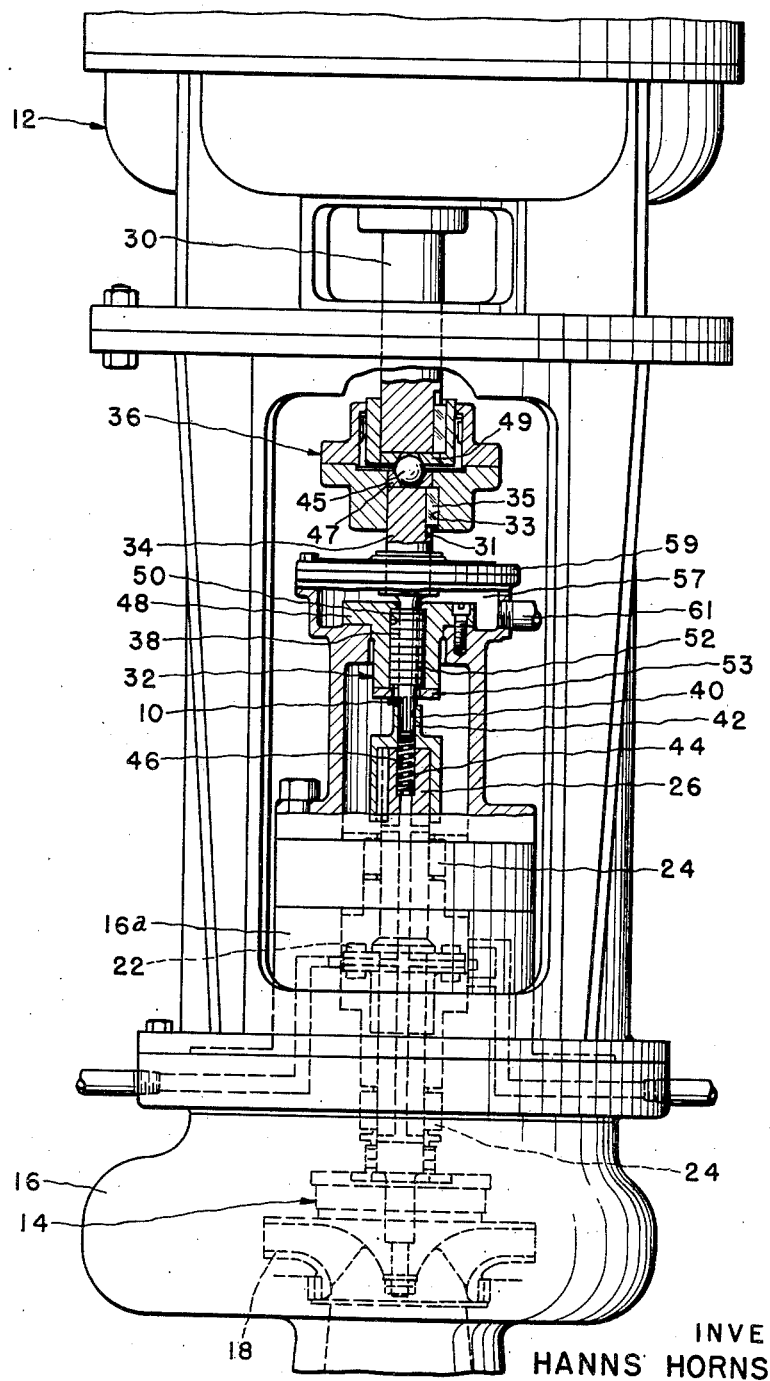

June 12, 1962    H. HORNSCHUCH    3,038,411
DRIVING CONNECTION
Filed July 12, 1955    2 Sheets-Sheet 1

INVENTOR
HANNS HORNSCHUCH
BY
HIS ATTORNEY

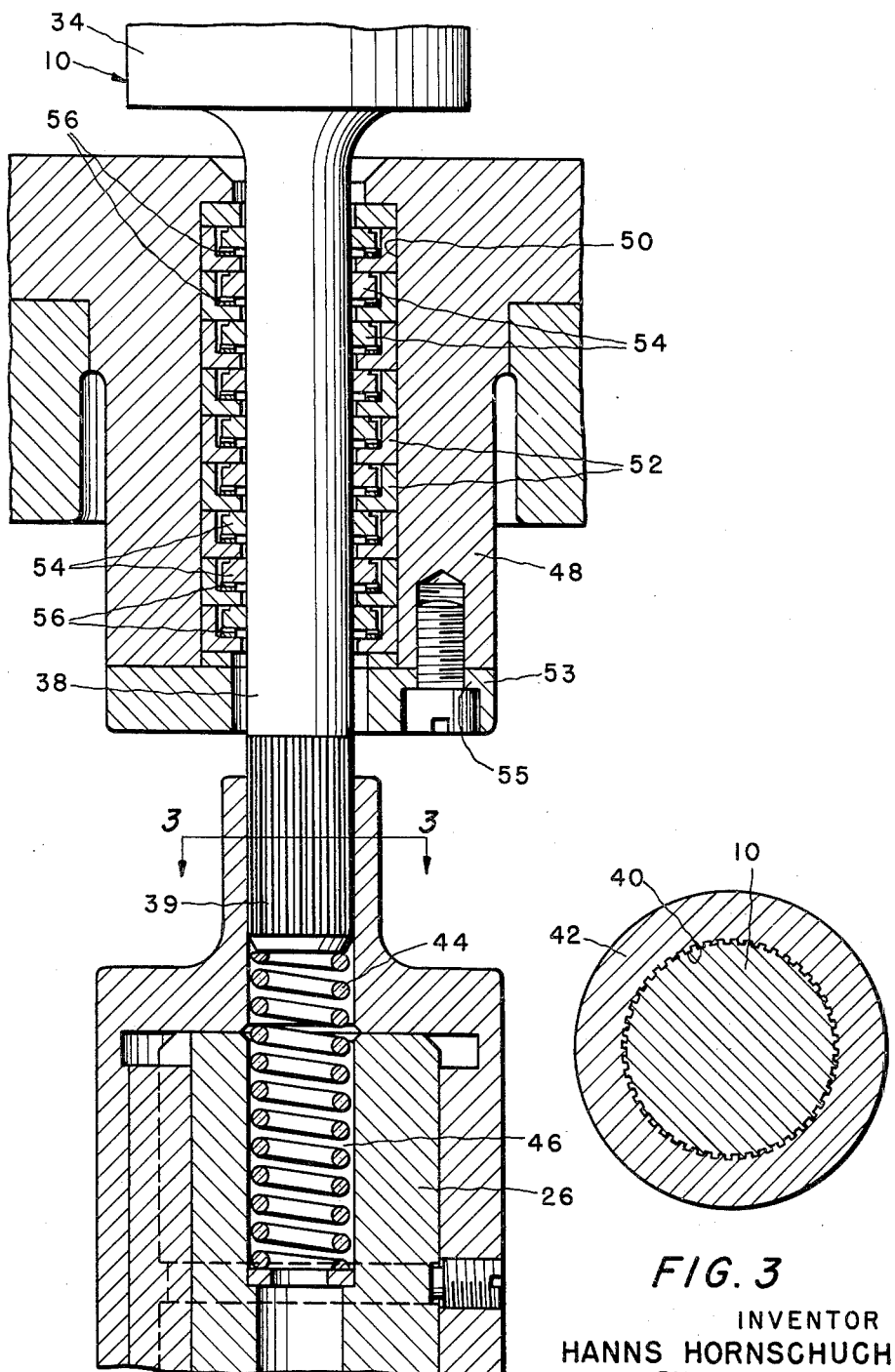

United States Patent Office 3,038,411
Patented June 12, 1962

3,038,411
DRIVING CONNECTION
Hanns Hornschuch, Easton, Pa., assignor to Ingersoll-Rand Company, New York, N.Y., a corporation of New Jersey
Filed July 12, 1955, Ser. No. 521,479
2 Claims. (Cl. 103—87)

This invention relates to driving connections and more particularly to a seal and driving connection for transmitting rotary force from a rotatable member in an area of relatively low fluid pressure through a pressure dividing wall to a rotatable member located in an area of relatively high fluid pressure.

Under these circumstances experience has shown that it is extremely difficult to seal against the leakage of pressure fluid from the high pressure area along the driving connection to the low pressure area. For example, such circumstances exist in a pumping operation where the pump is located in a high pressure fluid system and the pump driving motor is located externally of the system, thus requiring the pump shaft to pass through the pressure dividing wall, or casing, for connection with the motor. Where the fluid in such a system is water and the pressure is 1,000 or more pounds per square inch, leakage of fluid through the drive shaft seal of 10 to 15 gallons per minute is not uncommon.

The rate of leakage through the seal is a function of the pressure on the fluid, the viscosity of the fluid, the diameter of the shaft portion being sealed, and the length of the sealing area. The pressure and viscosity of the fluid are dictated by the particular operating circumstances. The diameter of the shaft, prior to this invention, was determined by the cumulative torque loads and bending loads on the shaft. Thus if in a particular installation the torque and bending loads are high, the diameter of the shaft is necessarily made relatively large to resist these forces. However, the larger the diameter of the shaft portion being sealed the more difficult it is to form an effective seal and accordingly the greater the leakage of pressure fluid from the system.

The relation of the diameter of the shaft portion being sealed to the difficulty of sealing the shaft against leakage is as follows. Where a floating type seal is used, and by floating type seal it is meant seals of the type wherein there is no contact between the sealing elements and the shaft but where the seal is obtained by maintaining a very small clearance between the shaft and sealing element, the amount of clearance between the shaft and the sealing element varies directly with the diameter of the shaft. That is, due to practical manufacturing limitations the larger the shaft, the larger will be the clearance between the sealing element and the shaft. Where a mechanical seal is used, and by mechanical it is meant a conventional seal in which a packing material is forced into sealing relation with the shaft, the effectiveness and life of the seal varies directly with the diameter of the shaft. Specifically, the greater the diameter of the shaft, the greater the sealing area to be sealed, and the higher the linear velocity of the shaft for any given revolutions per minute. Of course the higher this linear velocity, the higher the rubbing speed between the packing material and the shaft which results in rapid wearing away of the seal. With larger diameter shafts, this type of seal requires continuous attention to avoid excessive leakage.

In the present invention the diameter of the shaft portion to be sealed is greatly reduced by eliminating the bending forces on the shaft portion being sealed. Practically, a relatively small cross-sectional area torque shaft is used to transfer torque from the motor to the pump, this shaft has a floating type or flexible connection with either or both the motor and pump shafts such that there is little or no transfer of bending loads to the torque shaft.

It is accordingly one object of this invention to permit a reduction in size of a drive shaft element on which a seal is mounted by eliminating substantially all bending forces on the shaft.

Another object of the invention is to provide a torque transmitting shaft of substantially smaller cross-sectional area than the cross-sectional area of the rotating members connected thereby.

Another object of the invention is to provide such a shaft which is readily connectable at one end to existing shaft couplings.

Further objects of this invention will become obvious from the following specification and drawings in which FIGURE 1 is a vertical elevation, partly in section, showing a preferred embodiment of the torque transmitting element connected to transmit rotary force from a motor to a rotary type pump, FIG. 2 is an enlarged detail of FIG. 1 showing the torque transmitting element and seal, and FIG. 3 is a cross-sectional view of FIG. 2 taken along the line 3—3 looking in the direction of the arrows.

Referring to the drawings, a torque transmitting element 10 is shown adapted to transmit rotary motion from a driving member located in a low pressure area through a pressure containing wall to a driven member located in an area of relatively high fluid pressure.

For purpose of illustration the driven member is shown as a pump 14 of the centrifugal type. The pump includes a casing 16, 16a housing an impeller 18 mounted on a shaft 26 supported entirely by internal thrust and radial bearings 22 and 24, respectively. The driving element is illustrated as motor 12 mounted on and held in position relative to the pump 14 by means of a mounting bracket 28. Rotary motion is transmitted from the motor shaft 30 to the pump shaft 26 by the torque transmitting element 10 connected at one end to the motor shaft 30 and extending into the pump casing through a seal 32 for connection with the pump shaft 26.

The element 10 shown is cylindrical in shape and has at one end a keyway 31 to match a keyway 33 in a coupling 36 secured to the motor shaft 30. A key 35 fitted in the keyways 31 and 33 provides a slidable interlocking connection between the shaft element 10 and the motor shaft 30. This floating type connection is sufficiently flexible to avoid the transfer of any bending stresses from the motor shaft 30 to the shaft element 10. It is to be noted also that this end of the shaft element 10 is provided with an enlarged portion 34 so that a conventional type coupling 36 may be used to connect the shaft element 10 to the motor shaft 30.

The opposite end portion 38, or lower end portion as viewed in FIG. 1, of the element 10 is of substantially reduced diameter as compared to the motor or pump shafts. This shaft portion 38 extends through the seal 32 and has a floating type connection with the pump shaft 26. The connection here shown to prevent the transfer of bending stresses to the shaft element 10 is a slidable interlocking connection, and in furtherance to this end the element 10 is splined at 39 to be received by the internally toothed portion 40 of a cap 42 secured to the pump shaft 26. It is to be noted that although the connections of the element 10 with the pump and motor shafts are positive insofar as rotary motion is concerned, these connections are flexible to the extent that they permit some wobble movement, or off-center rotation, of the pump and motor shafts, due for example to bending stresses on these shafts, without transfer of a bending load to the element 10.

If desired, a bearing (not shown) can be provided to limit any wobble movement of the element 10 and one end of the element—e.g. at the end 34 may be fixedly connected to the associated shaft. Such an arrangement will introduce some bending stress in the element 10, but as compared to the stresses in a shaft fixedly connected at both ends, the stress thus introduced is relatively insignificant.

With the type of flexible connection disclosed and with the pump and motor combination mounted in the manner shown, the weight of the torque transmitting element 10 must at all times be supported to hold the element 10 in keyed relation with the coupling 36. Where there is fluid pressure in the pump system, the pressure of such fluid acting on the lower end of the shaft element 10 holds the shaft element in such engagement. A spring 44 contained in a recess 46 in the end of the pump shaft 26 and bearing against the lower end of the torque transmitting element 10 holds the element 10 in such engagement whenever there is little or no fluid pressure in the pumping system. A ball 45 fitted in sockets 47 and 49 in the opposed ends of the motor shaft 30 and element 10 is provided to transfer the endwise thrust on the element 10 to the motor shaft 30. It is to be noted that if the pump and motor were inverted—i.e., with the pump mounted on top of the motor, then the spring 44 would not be necessary.

The seal 32 shown by way of illustration is of the floating ring type comprising a housing 48 mounted on the casing part 16a and having a central bore 50 in which are fitted a plurality of washers 52 and sealing rings 54. Wafer type springs 56 are interposed between adjacent rings and washers to hold one side of each sealing ring 54 in sealing relation with the adjacent washer 52. The rings and washers are held in assembled relation and the springs 56 forced into their operative position by clamping these elements between an internal flange 55 at one end of the bore 50 and a plate 53 bolted to the housing 48 at the opposite end of the bore 50. The strength of the wafer springs 56 is such that they hold the sealing rings in sealing engagement with the washers 52, but permit sufficient sideways movement of the rings such that they seek their own centers on the shaft element 10.

Leakage of fluid along the shaft element 10 is restricted by making the clearance between the rings 54 and the shaft element 10 relatively small. For example, if the shaft element 10 has a diameter of approximately one inch then the sealing clearance can be limited to only about .001 inch. Any fluid leakage along the seal is collected in a leak chamber 57 provided in the casing part 16a between the outer end of the seal 32 and the casing end plate 59, and conducted from the chamber 57 through a conduit 61. Where the fluid in the pressure system is a liquid, the shaft may extend loosely through the plate 59, where the fluid is a gas, a secondary seal (not shown) may be required at the plate 59.

By way of illustrating the great extent to which the diameter of the shaft to be sealed may be reduced by the elimination of substantially all bending loads, tests have shown that with a motor pump unit in which the torque and bending loads required a three inch pump shaft, a torque shaft having a diameter of only one inch is sufficient to transfer the torque load. Moreover, this unprecedently small shaft was capable of transmitting the turning force of a 200 horse-power motor driving a pump at 3,500 revolutions per minute, where the pump developed approximately 50 p.s.i. to circulate a liquid under a pressure of 2,000 p.s.i.

The importance of this invention becomes readily apparent when it is recognized that in a conventional installation the three inch pump shaft or motor shaft would have to pass through the pump casing. In which case the clearance between the shaft and seal of the floating type would be in the neighborhood of .003 inch, whereas with the one inch torque shaft this clearance is reduced .002 inch or to .001 inch. Such a great reduction in seal clearance, of course, results in a very great reduction in leakage of fluid through the seal.

While I have shown and described a specific form of my invention, it is to be understood that various changes and modifications may be made without departing from the spirit of the invention as set forth in the appended claims.

I claim:

1. The combination with a casing adapted to contain fluid under relatively high pressure, a rotatable shaft external of the casing and a rotatable shaft within the casing, of a torque transmitting element extending through said casing for transmitting rotary motion from one shaft to the other and having a flexible type connection with at least one of said shafts and being unsupported throughout its length, and a seal encircling said element to restrict flow of fluid from the casing along said element, said element being of substantially smaller cross-sectional area at the portion encircled by said seal than the cross-sectional area of said shafts and the major diameter across any portion of said element being at least as large as the diameter of that portion in the seal area.

2. In a combination of a pump having a pump casing adapted to contain presure fluid and a motor; a rotatable drive shaft extending from said motor, a rotatable driven shaft within said casing, and a torque transmitting element extending through said casing for transmitting rotary motion from the drive shaft to the driven shaft and having a flexible type connection with at least one of said shafts and being unsupported throughout its length, a floating seal mounted in said casing and surrounding the element to restrict flow along said element, and the element being of substantially smaller cross sectional area at the portion extending through said seal than the cross sectional area of either of said rotatable shafts.

References Cited in the file of this patent

UNITED STATES PATENTS

| 1,928,795 | Reid | Oct. 3, 1933 |
| 2,086,806 | Hollander | July 13, 1937 |
| 2,236,887 | Arutunoff | Apr. 1, 1941 |
| 2,373,463 | Curtis | Apr. 10, 1945 |
| 2,379,868 | Curtis | July 10, 1945 |
| 2,380,113 | Kuhns | July 10, 1945 |
| 2,569,741 | Arutunoff | Oct. 2, 1951 |
| 2,627,732 | Gerner | Feb. 10, 1953 |
| 2,645,105 | Bedson | July 14, 1953 |
| 2,676,279 | Wilson | Apr. 20, 1954 |
| 2,772,547 | Nolan | Dec. 4, 1956 |

FOREIGN PATENTS

| 816,117 | Germany | Oct. 8, 1951 |